(12) United States Patent
Slaton et al.

(10) Patent No.: US 8,117,648 B2
(45) Date of Patent: Feb. 14, 2012

(54) SECURE INFORMATION STORAGE AND DELIVERY SYSTEM AND METHOD

(75) Inventors: Jonathan Slaton, Marshall, VA (US); Ryan B. Johnson, Haymarket, VA (US); Toan Tran, Bristow, VA (US); David Reed, Stone Ridge, VA (US); Abhilash Ravindran, Sterling, VA (US); George K. Tsantes, Great Falls, VA (US)

(73) Assignee: Intersections, Inc., Chantilly, VA (US)

( * ) Notice: Subject to any disclaimer, the term of this patent is extended or adjusted under 35 U.S.C. 154(b) by 920 days.

(21) Appl. No.: 12/068,636

(22) Filed: Feb. 8, 2008

(65) Prior Publication Data

US 2009/0205036 A1 Aug. 13, 2009

(51) Int. Cl.
G06F 15/16 (2006.01)
G06F 17/00 (2006.01)
G06F 21/00 (2006.01)

(52) U.S. Cl. ........... 726/6; 726/5; 726/30; 707/608; 707/621; 713/165; 713/182; 713/184; 713/185; 709/219; 709/248

(58) Field of Classification Search ............. 726/5, 6, 726/9, 28, 29; 707/607, 609, 610, 781; 713/182, 713/184, 185; 709/208, 219, 248
See application file for complete search history.

(56) References Cited

U.S. PATENT DOCUMENTS

| | | | | |
|---|---|---|---|---|
| 2003/0097451 A1* | 5/2003 | Bjorksten et al. | ........... | 709/228 |
| 2004/0073787 A1* | 4/2004 | Ban et al. | ........... | 713/159 |
| 2005/0010780 A1* | 1/2005 | Kane et al. | ........... | 713/182 |
| 2005/0055560 A1* | 3/2005 | Kendon | ........... | 713/189 |
| 2005/0171872 A1* | 8/2005 | Burch et al. | ........... | 705/29 |
| 2006/0085344 A1* | 4/2006 | Grim et al. | ........... | 705/51 |
| 2007/0077916 A1* | 4/2007 | Saito | ........... | 455/411 |
| 2007/0079133 A1* | 4/2007 | Hsieh | ........... | 713/182 |

(Continued)

OTHER PUBLICATIONS

Markus Lorch et al, A Hardware-secured Credential Repository for Grid PKIs, pp. 640-647, IEEE, 2004.*
Jim Basney et al, The MyProxy online credential repository, pp. 801-816, John Wiley & Sons, Ltd, 2005.*

(Continued)

*Primary Examiner* — Nasser Moazzami
*Assistant Examiner* — Shanto M Abedin
(74) *Attorney, Agent, or Firm* — Banner & Witcoff, Ltd.

(57) ABSTRACT

A system for secure information storage and delivery includes a vault repository that includes a secure vault associated with a user, wherein the secure vault is associated with a service level including at least one of a data type or a data size limit associated with the secure vault, the secure vault being adapted to receive and at least one data entry and securely store the at least one data entry if the at least one of a size or a type of the at least one data entry is consistent with the service level. A mobile vault server coupled to the vault repository creates a mobile vault on a mobile device based on the secure vault and is capable of authenticating the mobile device based on user authentication information. The mobile vault server includes a mobile device handler that communicates with the mobile device. A synchronization utility determines whether the at least one data entry on the secure vault is transferable to or storable on the mobile vault based on at least one of the size or the type of the at least one data entry and transfers the at least one data entry from the secure vault to a corresponding data entry on the mobile vault if the at least one data entry on the secure vault is determined to be transferable to or storable on the mobile vault.

19 Claims, 8 Drawing Sheets

U.S. PATENT DOCUMENTS

| | | | |
|---|---|---|---|
| 2007/0140489 A1* | 6/2007 | Dharmarajan et al. | 380/228 |
| 2007/0174520 A1* | 7/2007 | Moon | 710/62 |
| 2008/0034216 A1* | 2/2008 | Law | 713/183 |
| 2008/0148040 A1* | 6/2008 | Machani et al. | 713/150 |
| 2009/0025090 A1* | 1/2009 | Clement et al. | 726/28 |
| 2009/0037988 A1* | 2/2009 | Yang et al. | 726/6 |
| 2009/0104888 A1* | 4/2009 | Cox | 455/410 |

OTHER PUBLICATIONS

Ravi Chandra Jammalamadaka et al, Pvault: A Client Server System Providing Mobile Access to Personal Data, pp. 123-129, ACM, 2005.*

Charles J.Kolodgy, Identity Management in a Virtual world, White Paper, pp. 1-12, Aladdin Knowledge Systems, 2003.*

* cited by examiner

SECURE INFORMATION STORAGE AND DELIVERY SYSTEM AND METHOD

BACKGROUND OF THE INVENTION

1. Field of Invention

The present invention relates generally to identity theft solutions and, more particularly, to secure storage of personal information to avoid identity theft.

2. Background of the Related Art

In today's world, most people have numerous account numbers, credit card numbers, Personal Identification Numbers (PIN), and passwords, which are often difficult to remember and keep track of, but are frequently needed to gain access to personal accounts. For example, an individual may have several bank accounts, e.g., a checking account, a savings account, and a certificate of deposit (CD) account; several student accounts; a frequent flyers account; several insurance accounts; etc., each of which has an account number associated with it. Further, each account may also be associated with a user ID and a password for online access. Relying solely on memory to remember all this information may be impractical. Further, storage of such information in an insecure manner may subject the information to loss or theft, which could potentially lead to identity theft. Thus, a safe and secure storage mechanism that allows the user instant access to such information is highly desirable.

In addition, instant access to important personal documents such as legal documents (e.g., deeds, will, power of attorney, etc.) and financial documents (e.g., bank statements, W-2 form, etc.) is also often desirable. Storage of such documents in a database accessible through the web is possible. However, once again, if these documents or the information they contain fall into the wrong hands, such documents can be used for identity theft. Accordingly, what is needed is a mechanism for storage and delivery of important personal information and data that allows instant access to the information and data without comprising the security of the information and data.

SUMMARY OF THE INVENTION

An exemplary method for secure information storage and delivery, accordingly to an embodiment of the present invention, may include creating a secure vault associated with a user in a vault repository, the secure vault being adapted to securely store data; receiving a service level associated with the secure vault, the service level comprising at least one of a data type or a data size limit associated with the secure vault; receiving at least one data entry; storing the at least one data entry in the secure vault if the at least one of a size or a type of the at least one data entry is consistent with the service level; creating a mobile vault on a mobile device based on the secure vault; receiving user authentication information from the mobile device for authentication; and synchronizing the mobile vault with the secure vault. In an exemplary embodiment, the synchronizing step may include, for each of the at least one data entry: determining whether the at least one data entry on the secure vault is transferable to or storable on the mobile vault based on at least one of the size or the type of the at least one data entry; and transferring the at least one data entry from the secure vault to a corresponding data entry on the mobile vault if the at least one data entry on the secure vault is determined to be transferable to or storable on the mobile vault.

An exemplary system for secure information storage and delivery, according to an embodiment of the present invention, may include a vault repository including a secure vault associated with a user, wherein the secure vault is associated with a service level including at least one of a data type or a data size limit associated with the secure vault, the secure vault being adapted to receive and at least one data entry and securely store the at least one data entry if the at least one of a size or a type of the at least one data entry is consistent with the service level. The exemplary system may further include a mobile vault server coupled to the vault repository that creates a mobile vault on a mobile device based on the secure vault and is capable of authenticating the mobile device based on user authentication information. In an exemplary embodiment, the mobile vault server may include a mobile device handler that communicates with the mobile device; and a synchronization utility that determines whether the at least one data entry on the secure vault is transferable to or storable on the mobile vault based on at least one of the size or the type of the at least one data entry and transfers the at least one data entry from the secure vault to a corresponding data entry on the mobile vault if the at least one data entry on the secure vault is determined to be transferable to or storable on the mobile vault.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of preferred embodiments of the invention, as illustrated in the accompanying drawings, in which.

DETAILED DESCRIPTION OF THE EXEMPLARY EMBODIMENTS

Embodiments of the invention are discussed in detail below. In describing embodiments, specific terminology is employed for the sake of clarity. However, the invention is not intended to be limited to the specific terminology so selected.

While specific exemplary embodiments are discussed, it should be understood that this is done for illustration purposes only. A person skilled in the relevant art will recognize that other components and configurations can be used without parting from the spirit and scope of the invention.

Embodiments of the present invention provide a unique system and method that allow a user to conveniently store their most important information in a secure vault—a secure storage utility used for storage and safekeeping of valuable personal information and documents. The vault is stored on a secure database and is accessible by the user after proper authentication. In an exemplary embodiment, a two-factor authentication is performed to allow user access to the vault. The secure vault stores important information, such as, e.g., but not limited to, wills, irreplaceable pictures, financial documents, contracts, passwords, account numbers, etc. Secure access to that information may be available from anywhere in the world via, for example, a personal computer or a mobile device. In an exemplary embodiment, the information may be sent from the vault to other destinations such as, for example, a fax machine or an email address.

Figure 1:
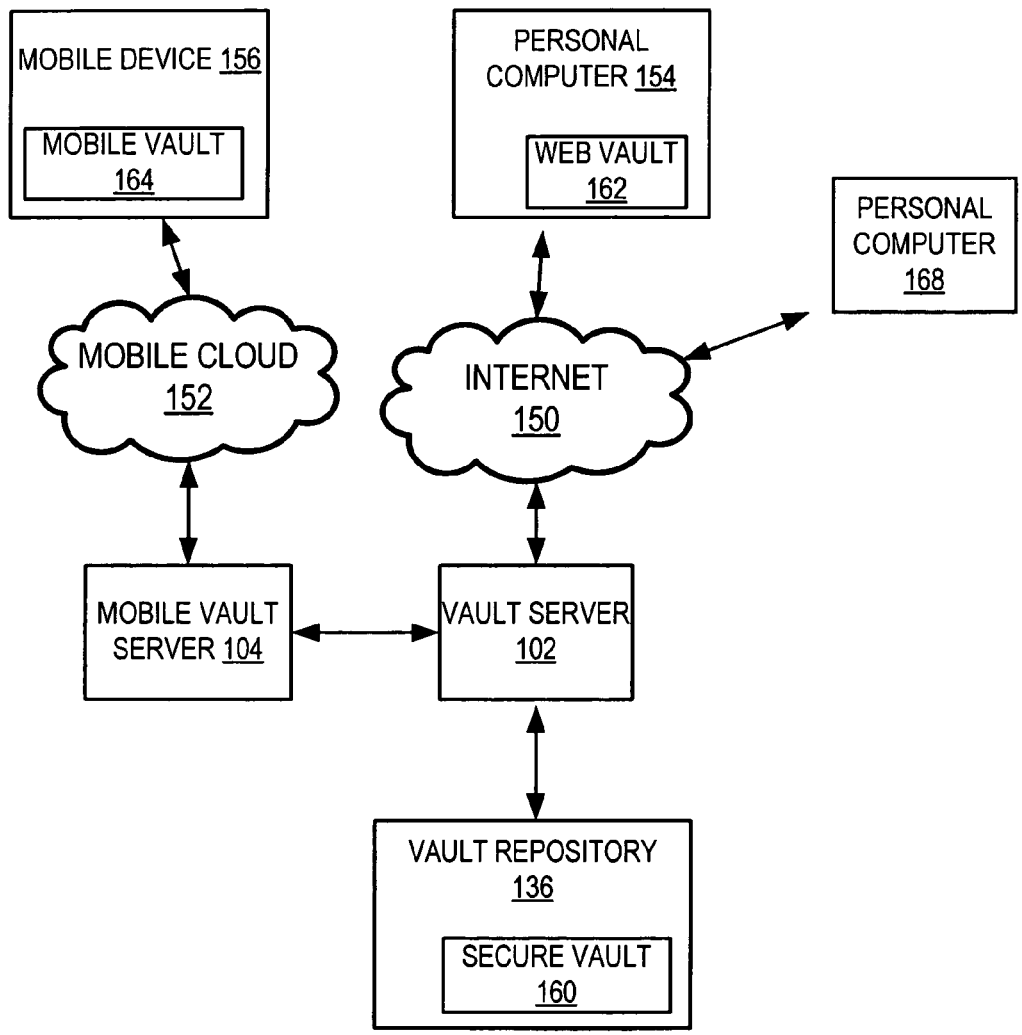
FIG. 1 depicts a basic system block diagram according to an exemplary embodiment of the present invention.

Referring to FIG. 1, there is illustrated an exemplary basic system block diagram according to an embodiment of the invention. In FIG. 1, there is shown a vault server 102 coupled to a vault repository 136. The vault server 102 is coupled to a personal computer 154 through a network such as the Internet 150 or a Local Area Network (LAN). Through the Internet 150, a user operating the personal computer 154 can store and access important data and information in a secure vault 160 in the vault repository 136. Such data may include, for example, account numbers, passwords, PINs, emergency contacts, irreplaceable photos, and important documents such as deeds, bank statements, personal journal, insurance documents, medical records and prescriptions. The secure vault 160 may be associated exclusively with the user and may only be accessed upon authentication and in a secure manner by the user.

In an exemplary embodiment, data securely stored in secure vault 160 may be categorized into various data types. For example, the data in the secure vault 160 data may be divided into passwords (User IDs and passwords associated with them), cards (bank cards and credit cards), loyalty numbers, text files, photographs, and other large documents. In addition, a user account may be associated with a specific service level indicative of the amount, size, and type of data that may be stored in the secure vault 160. In an exemplary embodiment, there may be four service levels, each including a specific number of passwords, pictures, large documents, etc., as well as the maximum total number of data items, that may be stored in the secure vault 160, at that level. Each service level may also have a pricing plan associated with it. An example of four service level is illustrated in table 1 below.

TABLE 1

| Level of Service | Passwords | Access Points | Credit Cards | Loyalty Cards | Large Docs | Pictures | Max |
|---|---|---|---|---|---|---|---|
| Level 1 | 3 | 3 | 3 | 3 | 0 | 0 | 10 |
| Level 2 | 10 | 10 | 10 | 10 | 5 | 0 | 30 |
| Level 3 | 999 | 999 | 999 | 999 | 50 | 50 | 999 |
| Level 4 | 999 | 999 | 999 | 999 | 999 | 999 | 999 |

In this table, a user at service level 1 can store up to three of each of the first four types of data. However, the user can stored a combined maximum of ten items. Therefore, if the user stored three passwords, three credit cards, and three loyalty cards, he could only store one access point. The number '999' indicates unlimited storage.

In an exemplary embodiment, the personal computer 154 may include a web vault 162. The web vault 162 may include a copy of all or a portion of the secure vault 160, stored locally on the personal computer 154. The web vault 162 may provide the user with quick access to the information without the need for the user to log into the vault repository 136 via the network. The contents of the web vault 162 may be synchronized with the secure vault 160, so that the data in the web vault 162 be me updated and automatically synchronized with the corresponding data in the secure vault 160.

In addition to the vault server 102, the system of FIG. 1 also includes a mobile vault server 104 coupled to the vault server 102. A mobile device 156, e.g., a cell phone or PDA, can connect to the mobile vault server 104 through a mobile cloud 152, e.g., a wireless network, which may itself be coupled to the Internet. Accordingly, the user may access the secure vault 160 in the vault repository 136 using the mobile device 156. The mobile device 156 may be coupled to the vault repository 136 via the mobile vault server 104 and the vault server 102. Alternatively, the mobile vault server 104 may be directly coupled to the vault repository 136.

In an exemplary embodiment, the mobile device 156 may include a mobile vault 164, which includes a copy of all or a portion of the secure vault 160. Similarly to the web vault 162, the mobile vault 164 may be synchronized with the secure vault 160. In an exemplary embodiment, data that is too large for transmission or storage on the mobile device 156 may be prevented from being transmitted from the secure vault 160 to the mobile vault 164. Specifically, in an exemplary embodiment, the mobile vault 164 may be adapted to store certain data types of sufficiently small size and such data may be synchronized between the mobile vault 164 and the secure vault 160. In an exemplary embodiment, if a particular data file is determined to be too large for transmission, information such as file name, data type, or data size of the file may be transmitted to the mobile vault 164. Further, a snapshot of the data, such as, e.g., a first page of the document or a small version of a photo, may be transmitted to the mobile vault 164. In an exemplary embodiment, the user may request such data to be sent from the secure vault 160 to a specified destination via email, fax, or SMS. For example, the mobile device 156 may be configured to allow the user to select a specific data file, select a transmission option (e.g., fax, email, SMS), and specify a destination (e.g., an email address, fax number, or mobile number), to which the data is sent. The user may make such a request using the mobile device 156 and/or the personal computer 154.

In addition to the personal computer 154 including a web vault 162 and the mobile device 156 including a mobile vault 164, a user may also use any other computer 168 coupled to the secure vault 160 to access the secure vault 160. In an exemplary embodiment, the user may retrieve authentication information, as will be described later in detail, from the mobile device 156 or the personal computer 154 and use that information to get access to the secure vault 160 through the computer 168.

Figure 2:
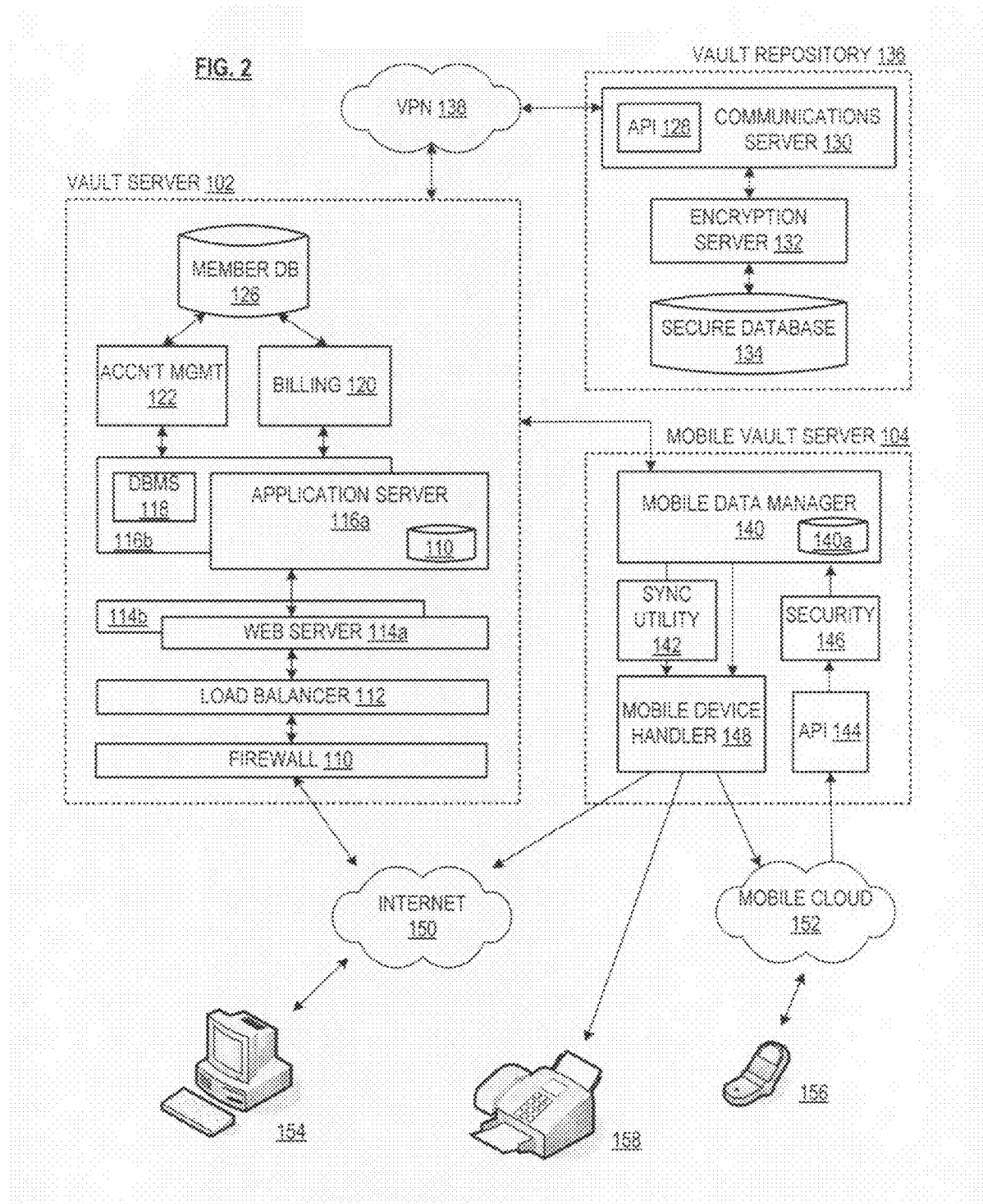
FIG. 2 depicts a more detailed exemplary system block diagram according to an exemplary embodiment of the present invention.

FIG. 2 depicts a more detailed exemplary system block diagram according to an exemplary embodiment of the present invention. In FIG. 2, the vault server 102 includes a firewall 110, which couples the vault server 102 to a network, e.g., the Internet 150, and provides secure communication between the vault server 102 and the network. Coupled to the firewall 110, in some embodiments, are one or more load balancer 112. The load balancer 112 may receive requests for data made to the vault server 102 and distribute these requests among a plurality of web servers 114a,b. The web servers 114a,b, together with the application servers 116a,b, may handle requests to send or receive data, which requests may be in the form of an HTTP request. The web servers 114a,b may also handle user authentication, data compression, virtual hosting, etc.

The application servers 116a,b may be coupled to the web servers 114a,b and provide the back-end application software that is responsive to and handles the requests. The application servers 116a,b may include a storage unit 110, which includes the back-end application software. The application software provides the web servers 114a,b with methods and protocols to handle the requests.

The application servers 116a,b may also include a DBMS (Database Management Server) 118, such as Oracle, DB2, Microsoft Access, Microsoft SQL Server, Postgres, MySQL, or FileMaker, which manages storage and retrieval of information to and from a database coupled to the application servers 116a,b. In an exemplary embodiment, one such database is the member database 126, which contains user registration information such as, for example, name, address, and billing information. The member database 126 may be coupled to an account management unit 122, which manages storage of user information on the database 126. Also coupled to the member database 126 may be a billing module 120, which handles billing the user via, e.g., a credit card transaction, automatic debit, etc.

In an exemplary embodiment, the application servers 116a,b are coupled to the vault repository 136 though a virtual private network (VNP) 138. The VNP 138 is a secure communications network tunneled through another network such as the Internet. The vault repository 136 may include a secure database 134 coupled to the application servers 116a,b via a communications server 130. The communications server 130 may be, for example, an open, standards-based computing system that operates as a carrier-grade open platform for a wide range of communications applications. In an exemplary embodiment, the secure vault 160 associated with the user may be stored in the secure database 134.

The communications server 130, in the exemplary embodiment, includes an application programming interface (API) 128, which is a code interface used to support requests to send or receive data to or from the vault repository 136. The API 128 may be public or private. Examples of API 128 may include the Single UNIX Specification and the Microsoft Windows API. The API 128 includes terms and methods provided as an interface to the vault repository 136. In an exemplary embodiment, the information on the API 128 is hidden from the general public and is available privately only to an authorized party, e.g., the vault server 102, who can access the vault repository 136 via the VNP 138. Thus, using the API 128, the vault server 102 can control who gains access to the secure database 134. For added security, in an exemplary embodiment, there may also be provided an encryption server 132 between the communications server 130 and the secure database 134 to encrypt/decrypt the data send to or received from the vault server 102.

In an exemplary embodiment, the personal computer 154 may connect to the vault repository 136 via the vault server 102. A user operating the personal computer 154 may create a secure vault 160 on the vault repository 136, in which the user may store personal data and documents. The user may access the vault repository 136 in order to retrieve, update, and store data to the secure vault 160. In addition to the secure vault 160, the user may create a web vault 162 on the personal computer 154. The web vault 162 can be synchronized with the secure vault 160. The user may also create a mobile vault 164 on the mobile device 156, which the user can then synchronize with the secure vault 160. Further, using the mobile vault 164 on the mobile device 156, the user may update, add, and delete data from the vault repository 136, or request data to be sent to a third destination such as, e.g., a fax machine 158, an email address, etc.

In an exemplary system of the present invention, the mobile vault server 104 may include an API 144, which provides the mobile device 156 a communication interface to access the vault 162 though the mobile cloud 152. The API 144 may be public or private. In an exemplary embodiment, the API 144 is private so that only a mobile device 156 including a mobile vault 164 can recognize the API 144 to communicate with the mobile vault server 104. In addition, the mobile vault server 104 may include a security module 146, which may be a firewall and/or a data encryption/decryption module.

Coupled to the security module 146 may be a mobile data manager 140. The mobile data manager 140 receives various requests, e.g., requests for information or synchronization, from the mobile device 156 through the API 144, processes the requests, and provides the mobile device 156 with information through the mobile device handler 148. The mobile data manager 140 may include an internal memory or database 140a, which may include the application code that manages and processes the various requests. The mobile data manager 140 is coupled to the vault repository 136 through the vault server 102. The mobile data manager 140 forwards a request to the vault server 102 and, upon receipt of data from the vault server 102, processes and forward the received data to a desired destination specified by the user through the mobile device handler 148. The mobile device handler 148 receives the data from the mobile data manager 140 and formats and outputs the requested data to the desired destination. In an exemplary embodiment, the formatting and processing of data is performed in accordance to a delivery method and destination specified by the user. The delivery method may be, for example, a fax sent to a fax machine, an email sent to a desired email address through the Internet 150, a SMS text message sent to the mobile device 156, or a SMS text message sent to another mobile device. Accordingly, the mobile device 156 may send requests for a document, a picture, an account number, etc. to be sent to a particular email address, fax number, or SMS number. The mobile device 156 may also initiate synchronization with the secure vault 160 in the vault repository 156, in which case the mobile device handler 148 formats and forwards the data to the mobile device 156.

In addition, in an exemplary embodiment, the mobile vault server 104 may include a synchronization utility 142 coupled to the mobile data manager 140. In this case, the synchronization utility 142 is responsible for monitoring the data that is being sent to the mobile device 156. If the size of the data is too large for transfer or storage in the mobile device 156, the synchronization utility 142 may prevent the data transfer to the mobile device 156. In an exemplary embodiment, data may be classified by data types (e.g., passwords, cards, text files, photographs, and large documents) and certain data types (e.g., photographs and large documents) may be prevented from being transmitted to the mobile device 156. In an alternative embodiment, the data having a size greater than a threshold data size may be prevented from being transferred to the mobile device 156. Further, in an embodiment of the invention, if certain data is determined to be too large for transmission, snapshots of the data (e.g., a small photo snapshot or a view of the first document) may be created and transmitted to the mobile device 156. The snapshot may be created at run time or may be created and stored at the vault 162 prior to request for synchronization. Additionally or alternatively, other information regarding the data, for example, data size, data, number of pages, title, etc., may be transmitted to the mobile device 156, representing the corresponding data in the vault 162.

Figure 3:
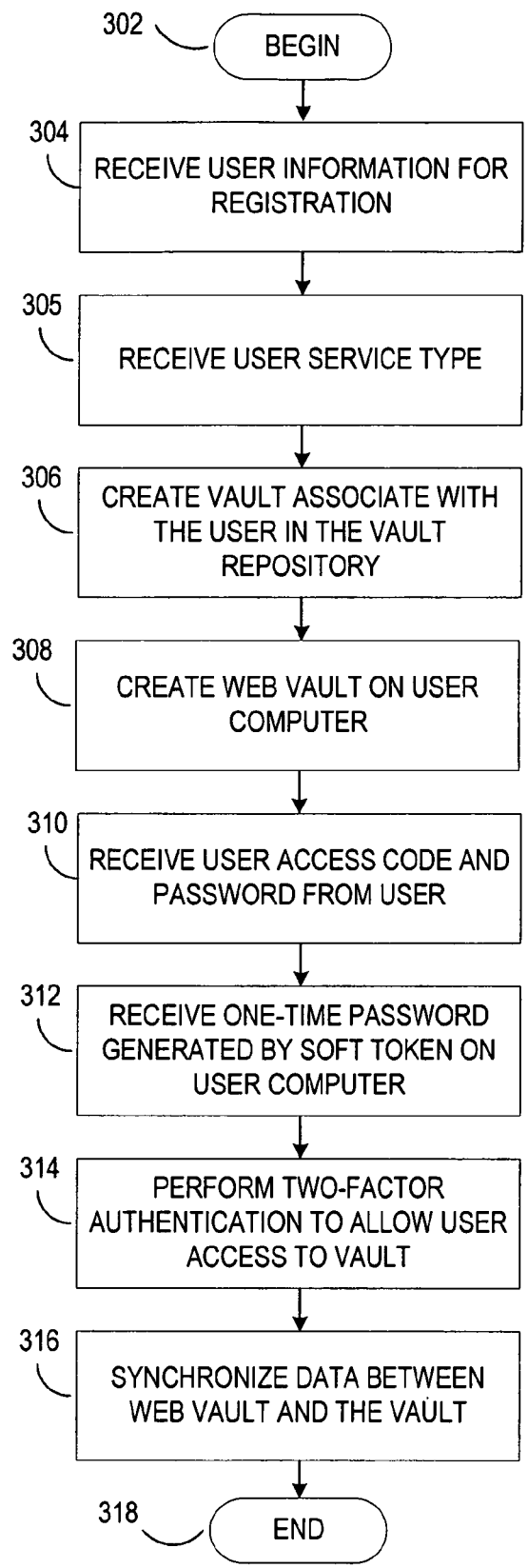
FIG. 3 depicts an exemplary process flow diagram for installation and access to a web vault using a personal computer, according to an exemplary embodiment of the present invention.

Referring now to FIG. 3, there is illustrated an exemplary process flow diagram for installation and access to the web vault 162 using the personal computer 154, according to an embodiment of the invention. In the exemplary process, starting with block 302 and continuing with block 304, the vault server 102 receives registration information from the user to create an account. The registration information may include, for example, the residence and billing information. In an exemplary embodiment, registration information also includes a service type, block 305. Service type may include, for example, the size of the secure vault 160 associated with the account and/or the type and size of the data that can be stored in the secure vault 160, as previously explained.

After receiving the user registration information, a secure vault 160 associated with the account is created in the vault depository 136, block 306. A unique access code and a password may also be received and associated with the secure vault 160. Alternatively, an access code may be assigned to the account by the vault server 102.

The user may then download a software application, herein referred to as the web vault application, through the Internet 150 and install the web vault application on the computer 154. The web vault application provides secure access from a personal computer 154 to the secure vault 160, block 308. The web vault application is typically a software program that is installed and runs locally on the personal computer 154. Alternatively, the web vault application may be a web-based program running on the application servers 116a,b, executable through a browser on the personal computer 154. The web vault application allows the user to access the secure vault 160 associated with that user on the vault repository 136 in order to store and/or retrieve personal information in a secure manner.

In an exemplary embodiment, during or after the web vault application download, the vault server 102 may generate and install at least one soft token (i.e., software token) on the personal computer 154. If the web vault application is a web application running through a browser, the soft token may be in the form of a cookie. The soft token is used to ensure that the computer 154 is associated with a valid user and is associated with the secure vault 160. The soft token is also used for user authentication, as will be described later in detail.

Once the web software application is installed, the user may sign in to the secure vault 160 on the vault repository 136 using the access code and password, block 310. The access code and password validation may occur at the web vault application, at the vault server 102, or at the vault repository 136. In an exemplary embodiment, the soft token may keep count of the number of times the user enters the access code and password and block the user out of the web vault application if the access code and/or password are entered incorrectly more than a predetermined number of times.

In an exemplary embodiment of the invention, in order to provide further security, a two-factor authentication is provided. Two-factor authentication includes a second factor for user authentication in addition to the validation of the access code and password discussed above. In this case, the second factor includes authentication using a one-time password (OTP) in addition to verification of user's access code and password. An OTP is a password that is altered each time it is regenerated in order to minimize its exposure to unauthorized intruders. In this case, the OTP is generated at two different nodes—an OTP server (not shown) resident on the vault server 102 or the vault repository 136, and the soft token on the user computer 154. There are three common types of OTP. In one embodiment, the OTP is generated using a mathematical algorithm based on the previous OTP. Thus, starting from a common password, both the OTP server and the soft token on the computer 154 always generate the same new password. In a second embodiment, the OTP is generated based on time-synchronization between the OTP server and the soft token. In this embodiment, the soft token includes an accurate clock that has been synchronized with a clock of the OTP server and the password is generated based on the two clocks. In a third embodiment, the OTP is generated using a mathematical algorithm that is based on a challenge (e.g., a random number determined based on transaction details) and a counter.

In order to perform two-factor authentication, the soft token on the user computer 154 generates a first OTP to be sent along with the user's access code and password to the vault server 102, block 312. The two-factor authentication may be performed at the vault server 102 and/or the vault repository 132. In an exemplary embodiment, the vault server 102 performs a first authentication on the access code and password. If the access code and password are valid, the vault server 102 then forwards the first OTP generated by the soft token to the vault repository 136, block 314. The vault repository 136 may include an OTP server that handles a second factor authentication. In that case, the OTP server receives the first OTP, generates a second OTP independently, and compares the first OTP with the second OTPs. If the first OTP matches the second OTP, the user is authenticated to access the secure vault 160 on the vault repository 136. Otherwise, the user may be blocked out of the secure vault 160.

Once two-factor authentication is performed, the user is allowed access to the secure vault 160. In an exemplary embodiment, in order to allow the user access to the secure vault 160, a copy of the secure vault 160 is also stored locally in a web vault 162 within a hard disk or memory of the personal computer 154. The web vault 162 may be created by the web vault application. The web vault 162 may be synchronized with the secure vault 160 in the vault repository 136 automatically or upon user request, block 316. In an exemplary embodiment, the web vault 162 may only be downloaded on a personal computer that includes a soft token. The synchronization may be one-way, such that the user may update the web vault 162 via the personal computer 154 and later synchronize the secure vault 160 to include the updated data of the web vault 162 or vice versa. Alternatively, the synchronization may be two-way, such that the user may specify which of the secure vault 160 or the web vault 162 is to be synchronized. In yet another embodiment, two-way synchronization may be performed automatically, such that based on which data entry was last updated, data may be copied from the web vault 162 to the secure vault 160 or vice versa. Using the web vault 164, the user can safely and securely store their most important personal data, which they can access through the personal computer 154. The process flow may then end, block 318.

Figure 4:
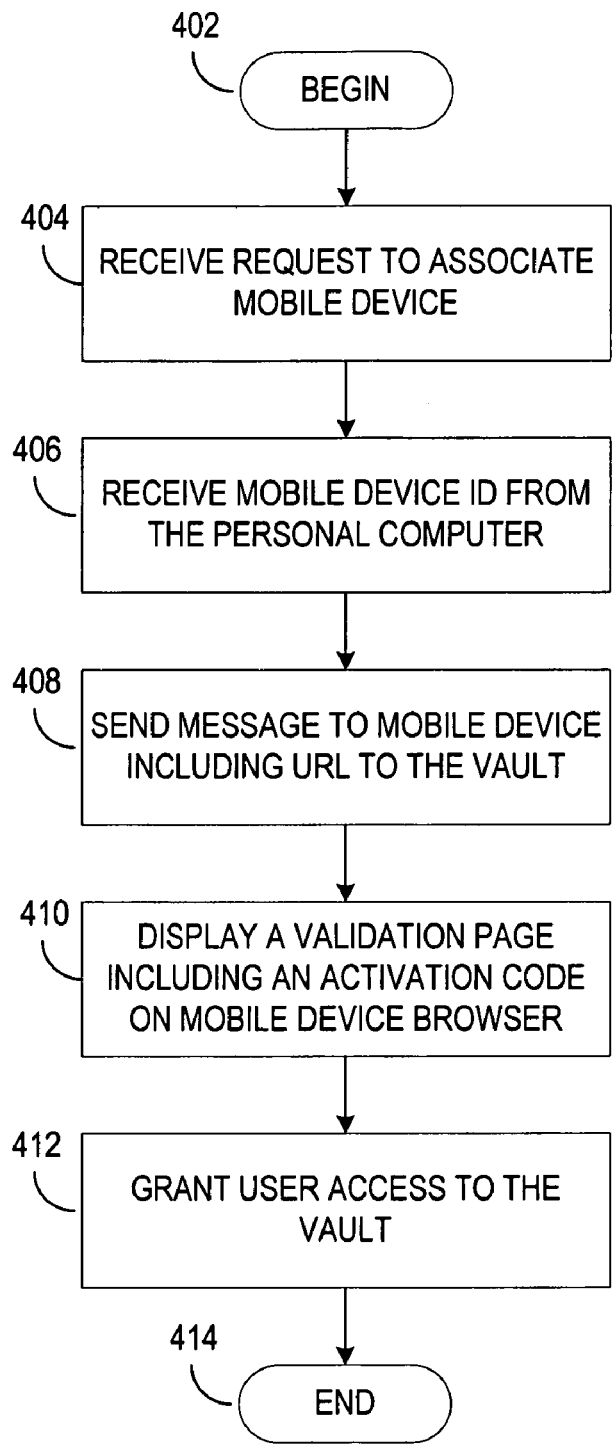
FIG. 4 depicts an exemplary process flow diagram for access to a secure vault from a mobile device, according to an exemplary embodiment of the present invention.

Referring now to FIG. 4, there is depicted an exemplary process flow diagram for accessing the secure vault 160 from a mobile device 156, according to an exemplary embodiment of the invention. In the exemplary process flow, starting with block 402 and continuing on to block 404, the a request is received though the web vault application running on the computer 154 to associate a mobile device 156 with the vault 162, allowing the user to access the vault 162 using the mobile device 156. To associate the mobile device 156, the user enters a device ID of the mobile device 156 in the web vault application on the personal computer 154, block 406. The device ID may include, for example, a telephone number, a mobile IP address, or other mobile identification number associated with the mobile device 156. The mobile device 156 may be a cell phone, a PDA, or any other mobile computing device. The web vault application forwards the device ID along with the request to associate the mobile device 156 with the vault server 102. The vault server 102 then forwards the device ID to the mobile vault server 104. The mobile data manager 140 may send a communication though the mobile device handler 148 to the mobile device 156, block 408.

In an exemplary embodiment, the communication may be an SMS message including a URL. The user clicks "submit" on the mobile device 156 to follow the URL. Thereafter, a validation page appears on the mobile device browser including an activation code, block 410. The user may use this activation code to enter a site associated with the secure vault 160 on the mobile device 156. From this site, the user may view the contents of the vault 162, block 414. In a further embodiment, the user may also update, upload, or delete the data entries in the vault 162. The process flow may end, block 414.

Figure 5:
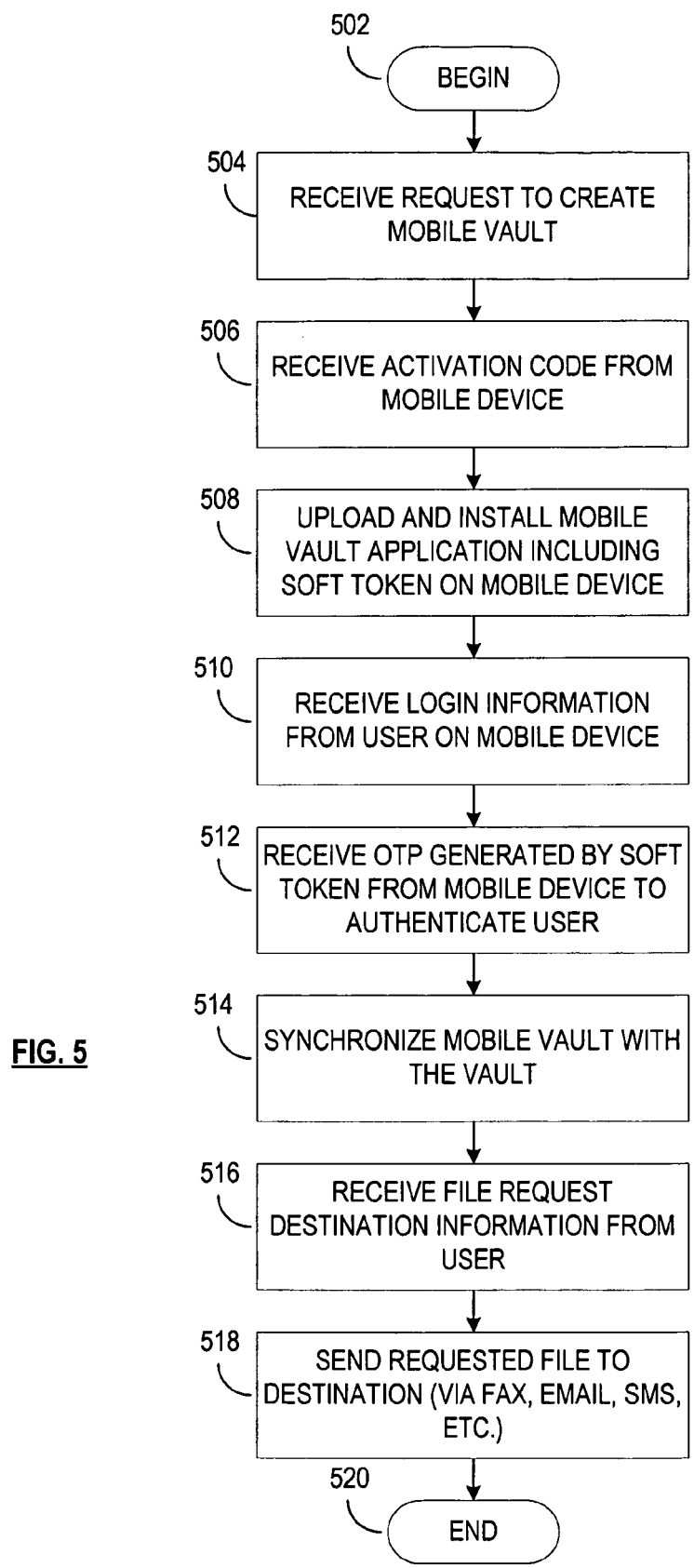
FIG. 5 depicts an exemplary process flow diagram for creating, accessing, and synchronizing a mobile vault, according to an exemplary embodiment of the invention.

Referring now to FIG. 5, an exemplary process flow diagram for creating, accessing, and synchronizing a mobile vault 164 is illustrated according to an embodiment of the invention. In this embodiment, starting with block 502 and continuing to block 504, the user may request a mobile vault application to be downloaded on the mobile device 156. The mobile vault application may create a mobile vault 164 on the mobile device 156, which may include a copy of all or a portion of the secure vault 160, stored locally on the mobile device 156. The mobile vault application may also include a synchronization mechanism, requesting the data from the secure vault 160 to be transferred to the mobile vault 164. The mobile vault application may also create a virtual environment on the mobile device 156 referred to herein as the "mobile wallet." In an exemplary embodiment, the mobile wallet provides an interface through which the user may directly access the mobile vault 164 and/or the secure vault 160.

In order to activate the mobile vault 164 in the mobile vault application, the user enters an activation code, which may be the activation code previously received in 410 in the browser window, block 506. Thereafter, the mobile vault application is uploaded onto the mobile device 156, block 508. In an exemplary embodiment, a soft token may also be stored in a local memory of the mobile device 156 during the installation of the mobile vault program. The mobile vault application may create a mobile vault 164 on the mobile device 156. The mobile vault application may also set up a mobile wallet interface for user access to the mobile vault 164 and/or the secure vault 160. In an exemplary embodiment, the mobile wallet may display the list of items stored in the secure vault 160 and mobile vault 164 and give the user an option to synchronize the mobile vault 164 with the secure vault 160. Further, the mobile wallet may give the user an option to delete, update, or view the data in the mobile vault 164 and/or the secure vault 160.

After the installation is complete, the user may start the mobile wallet and log in using their access code and password, block 510. Similarly to the process described for the personal computer 154 with reference FIG. 4, the soft token in the mobile device 156 automatically generates an OTP to allow access to the vault repository 136. After the user logs in using the access code and password and the OTP is generated, the mobile vault application forwards the access code, password, and the OTP to the mobile vault server 104 for authentication and, if allowed, connects to the mobile vault server 104, block 512. Through the mobile wallet, the user may connect to the vault repository 136 so as to access the secure vault 160. The user may then add, delete, or update the contents of the secure vault 160 via the mobile device 156 using the mobile vault application.

In addition, the user may use the mobile wallet to update and synchronize the mobile vault 164 on the mobile device 156 with the secure vault 160, block 514. The synchronization process may start automatically upon the user login, or, alternatively, may start upon specific user request for synchronization. The user may add, delete, or update the data in the mobile vault 164 upon user authentication. The synchronization process, however, may require two-factor authentication. In an exemplary embodiment, the synchronization utility 142 (FIG. 2) may control the flow of data to the mobile device 156. For example, after user request for data synchronization to the mobile vault 164, or user request for specific data in the secure vault 160, the synchronization utility 142 may monitor the size of the data being transferred and, if the data is too large for wireless transfer or if it is too may large to be stored in the mobile device 156, the synchronization utility 142 prevent the data to be transferred to the mobile device 156. Upon synchronization, the user's changes in the mobile vault 164 may automatically be reflected in the secure vault 160. Alternatively, the synchronization may be made from the secure vault 160 to the mobile vault 164, so that the mobile vault is updated according to the contents of the secure vault 160. In yet another embodiment, the synchronization utility may determine which of the secure vault 160 or mobile vault 164 was the latest to be updated and synchronize the other accordingly.

According to a further embodiment of the invention, in addition to accessing and viewing the data on the mobile device 156, data may be sent from the secure vault 160 to a specified destination such as a fax machine, an email address, or another mobile device, block 516. In that case, the mobile vault server 104 delivers the requested dada, such as documents or information, to that destination. In an exemplary embodiment, the user is presented with a list of items in the vault repository 136 and can select one or more specific items to be sent. The user is also presented with a field on a screen of the mobile device 156, which may be presented through the mobile wallet interface, where she can enter a fax number, an email address, a phone number, or other destination address. After the mobile data manager 140 receives the selected item and the destination address, it sends the requested data via the mobile device handler 148 to the designated destination in the appropriate format, for example, of an email, a fax, a SMS message, etc., block 518. The process flow may end, block 520.

Figure 6:
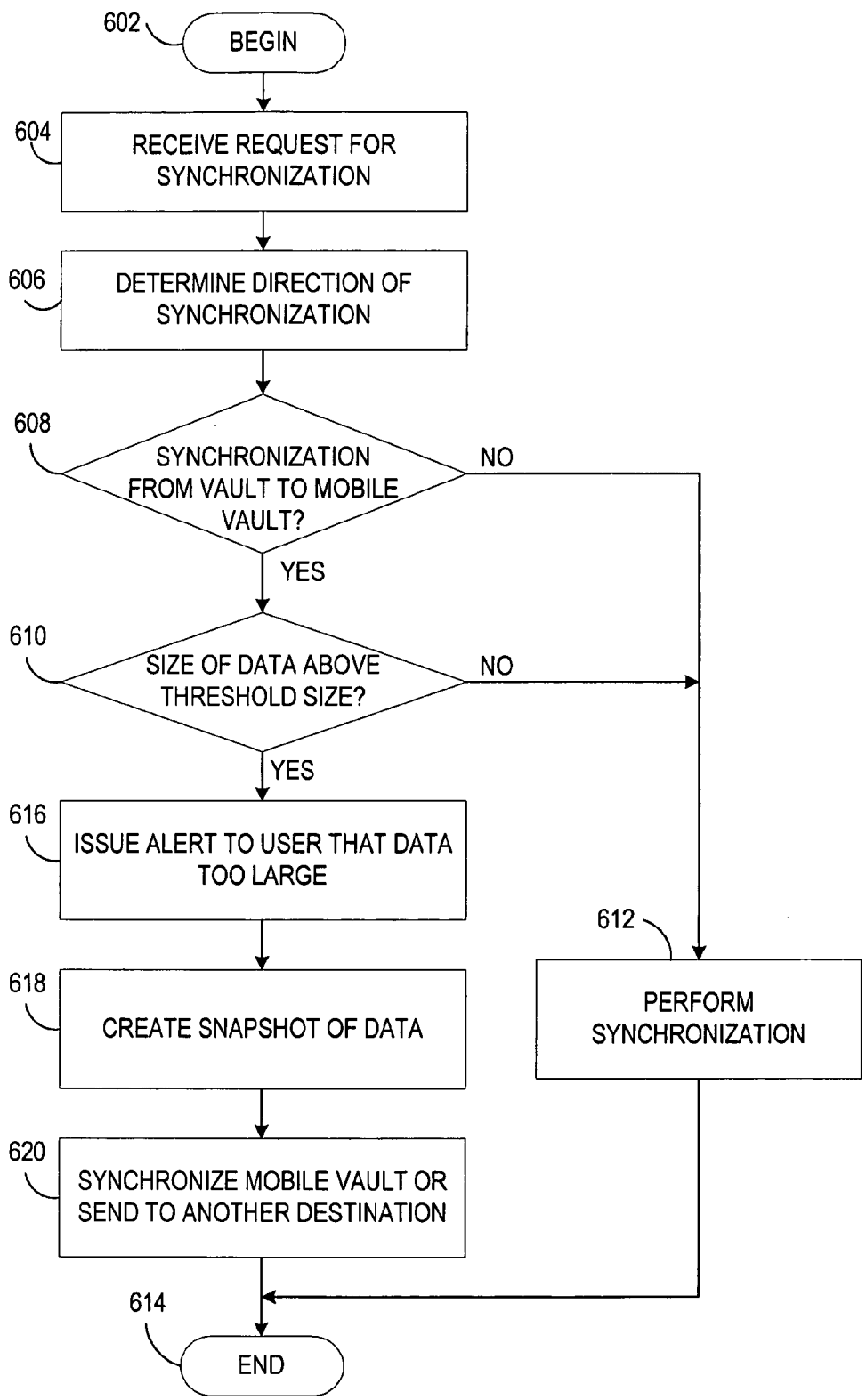
FIG. 6 depicts an exemplary process flow diagram for synchronization of the mobile vault with the vault, according to an exemplary embodiment of the invention

Turning now to FIG. 6, an exemplary process flow diagram is depicted for synchronization of mobile vault 164 with secure vault 160, according to an exemplary embodiment of the invention. In FIG. 6, starting with 602, the process may continue with the synchronization utility 142 receiving a request for synchronization from the mobile device 156, block 604. Alternatively, synchronization may be performed upon user login and without specific request for synchronization. In yet another embodiment, synchronization may be performed periodically or may even be initiated by the synchronization utility 142 upon occurrence of an event (e.g., upon determination that the secure vault 160 or the mobile vault 164 has been recently modified or updated).

After receiving a request for synchronization, in an exemplary embodiment, the synchronization utility 142 may then determine the direction of synchronization (i.e., whether the secure vault 160 or the mobile vault 164 is to be updated), block 606, 608. The request for synchronization may be indicated in the request for synchronization. Alternatively, the synchronization utility 142 may determine which of the secure vault 160 or the mobile vault 164 was the latest to be modified or updated and synchronize the other accordingly. If the secure vault 160 is to be synchronized with the mobile vault 164, the process may proceed to perform synchronization by updating the data in the secure vault 160 based on the contents of the mobile vault 164, block 620

In an exemplary embodiment, if synchronization is to be performed from secure vault 160 to mobile vault 164, the synchronization utility 142 may proceed to determine whether the size of any of the data for synchronization is too large for transfer or storage on the mobile device 156, block 610. If so, the synchronization utility 142 may prevent the data from being transferred. In an exemplary embodiment, data may be categorized into various types (e.g., passwords, cards, text files, large documents, and photos) and the synchronization utility 142 may prevent data files of particular types (e.g., photos and large documents) from being transferred to the mobile device 156. Alternatively, the synchronization utility 142 may prevent files larger than a predetermined threshold data size from being transferred to the mobile device 156. Otherwise the synchronization utility 142 may proceed with synchronization, block 612. The process may then end, block 614

In an exemplary embodiment, if the synchronization utility 142 blocks transfer of a file, it may issue a message to the mobile device 156, indicating an error in transfer, or notifying the user that, e.g., the file is not transferable, block 616. The synchronization utility 142 may also give the user an option to specify a destination (e.g., email address or fax) for a data file that is too large for transfer or storage to be sent.

In a further embodiment, if the data is too large for transfer or storage on the mobile device 156, the synchronization utility 142 may create a snapshot of the data file (e.g., by truncating a large photo to a small snapshot or creating a one-page document including the first page of a large document) to be sent to the mobile device 156, block 618. The snapshot may also include a compressed version of the data file. Additionally or alternatively, the synchronization utility 142 may transfer information relating to the data file, e.g., data type, size, date of creation, title, etc., to the mobile device 156. The synchronization utility 142 may then send the snapshot or file information to the mobile vault 164, block 620. Alternatively, the original data file may be sent to a specific destination (e.g., fax number of email) specified by the user. The process may then end, block 614.

In a further embodiment of the invention, the user may use a computer 168 (FIG. 1) other than the personal computer 154, which may not include the web vault 162 and/or the soft token to access the contents of the secure vault 160. The personal computer 154 may include the soft token necessary to generate an OTP for access to the secure vault 160 and may synchronize the web vault 162 resident on the personal computer 154 with the secure vault 160. The computer 168, however, does not include a web vault 162, nor does it include a soft token to allow user access to the secure vault 160.

Figure 7:
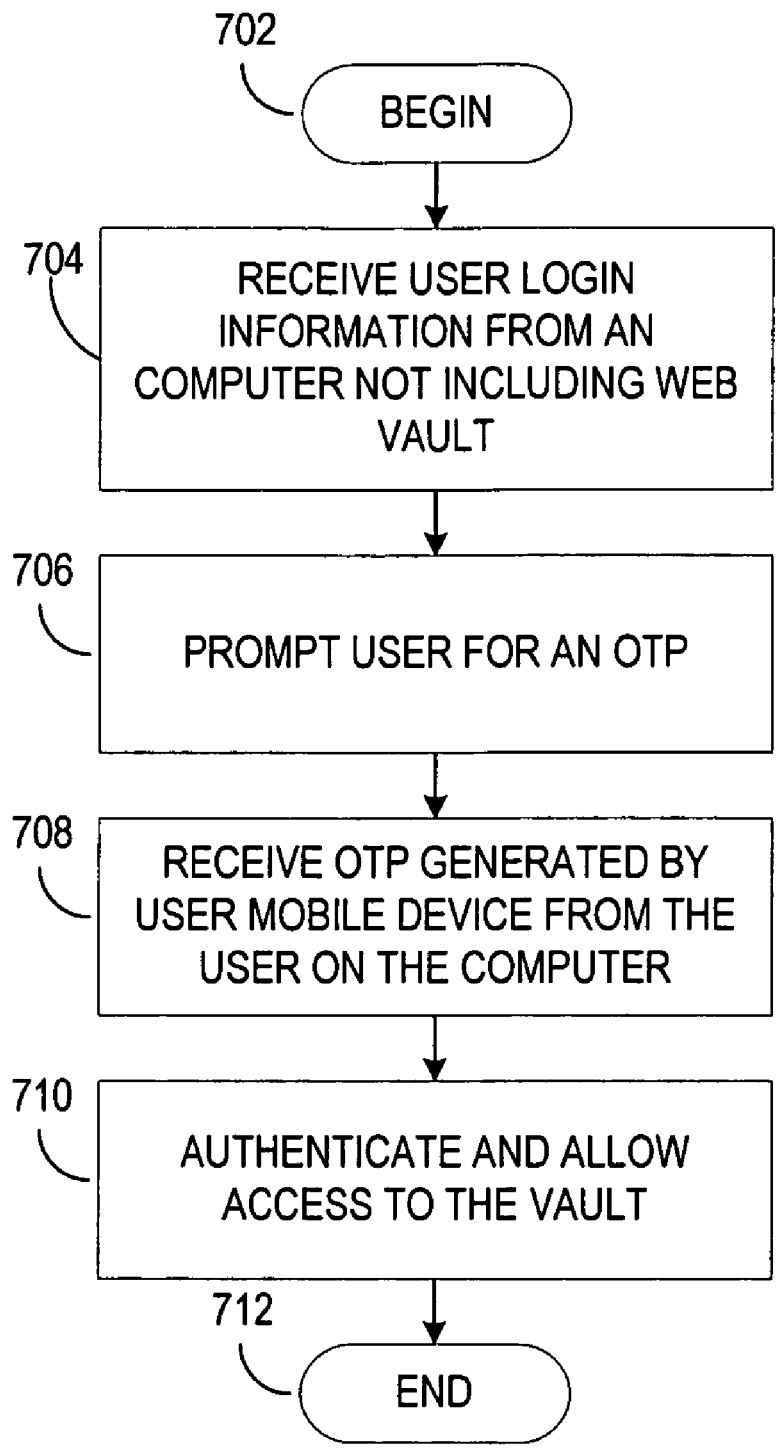
FIG. 7 depicts an exemplary process flow diagram for using a computer not including a web vault to access the vault in the vault repository, according to an exemplary embodiment of the invention.

FIG. 7 depicts a process flow for using a computer 168 not including a web vault 162 to access the secure vault 160 in the vault repository 136 according to an embodiment of the invention. In FIG. 7, starting with block 702, the process may continue with receiving user login information from the computer 168, through a web site designated for access to the vault server 102, block 704. The user may log into the vault server 102 using her access code and password. Upon authenticating the access code and password, the user may then be prompted to enter an OTP to access the vault repository 136, block 706. In an exemplary embodiment, a mobile device 156, which already includes a soft token to generate and/or retrieve an OTP. In an exemplary embodiment, the user may be provided with an option in the mobile wallet interface to request an OTP to be generated. The soft token resident on the mobile device 156 may then generate an OTP. Once the OTP is generated, it may be displayed on the mobile device 156. Alternatively, the mobile device 156 may present the user with a field on the mobile device 156 screen, where the user can enter a destination address such as a fax number, email address, etc. The mobile device 156 may then send the OTP to that destination. Once the user receives the OTP, she may enter it manually in a prompt field on the computer 168, block 708. The entered OTP is then authenticated as previously described and access is granted to the secure vault 160, block 710. The process may then end, block 712.

In addition to secure storage and delivery of personal data, embodiments of the invention may provide delivery of additional services to the mobile device 156. In an exemplary embodiment, such services may include, but are not limited to, identity theft solutions, identity risk analysis, banking solutions, travel advisory, legal and financial services, etc.

Figure 8:
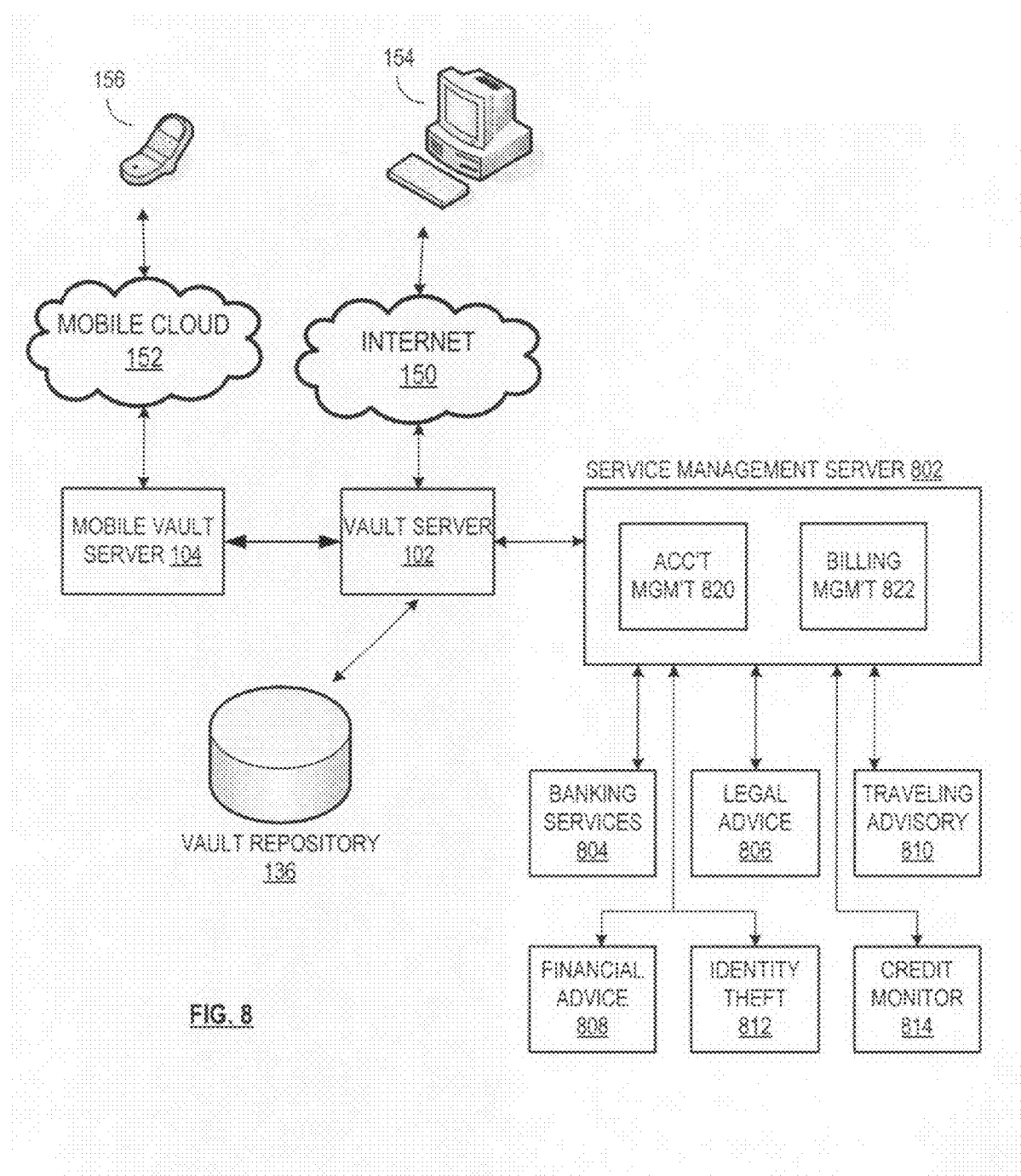
FIG. 8 depicts an exemplary block diagram of a system providing additional mobile services according to an exemplary embodiment of the invention.

FIG. 8 depicts an exemplary block diagram of a system providing such additional mobile services, according to an exemplary embodiment of the invention. In FIG. 8, the exemplary system of the present invention as depicted in FIG. 1 is further coupled to a service management server 802. The service management server 802, in an exemplary embodiment, includes an account management module 820 and a billing module 822, which manage the user account and billing for the services provided to the user. The service management server 802 is coupled to a plurality of service providers including, but not limited to a banking services provider 804, a legal advice provider 806, a financial advice provider 808, a traveling advisory provider 810, a theft identity solutions provider 812, and a credit monitoring provider 814.

In an exemplary embodiment, the banking services provider 804 is coupled to one or more bank accounts of the user and provides the user the ability to check their account balance using the mobile device 156 in a secure manner via the mobile vault server 104. Further, the banking services provider 804 monitors the bank account and sends the user a notification upon an occurrence a trigger. The trigger may be, for example, occurrence of an unusual or suspicious activity on the account, suspension of the account, or if the account balance falls below a predetermined level. The notification can be an SMS sent through the mobile vault server 104 to the mobile device 156.

The legal advice provider 806 may be, for example, an entity providing online legal advice. In an exemplary embodiment, the user types in a legal question through the mobile device 156, the personal computer 154, or the computer 168. The question is directed to the legal advice provider 806 though the service management server 802. The user may also provide a fax number or email address where the response can be send. A legal expert may provide a response, which is then sent back to the service management server 802. The user is then billed accordingly for the legal services and the expert's response is directed to the destination provided by the user. The financial advice provider 808 operates in a similar manner.

In an exemplary embodiment, the travel advisory 810 may be configured to send weather advisory alert to user upon occurrence of a certain trigger. The trigger may be, for example, prediction or detection of severe weather in a certain geographic area. Weather advisory may also include advising the user on the whether in travel destinations. The travel advisory 810 may also be coupled to a flight information center (not shown) to provide flight information to the user, including, for example, whether they should expect a delay in a scheduled flight. The travel advisory 810 may send alerts via an SMS message to the user on the mobile device 156.

The identity theft solutions provider 812 may provide a variety of identity theft solutions to the user via the mobile device 156. In an exemplary embodiment, the identity theft solutions provider 812 monitors the user's various bank accounts, credit accounts, information databases, etc., and alerts the user if the user's identity has been compromised. Also, the identity theft solutions provider 812 may perform an identity theft risk score analysis based on various criteria, such as, e.g., the degree of compromise of the person's identity in an online credit card transaction. The identity theft solutions provider 812 then sends the user an alert, e.g., in the form of a SMS message to the mobile device 156, if the risk score is higher than a predetermined number. Similarly, the credit monitoring provider 814 monitors the credit activities of the user on various credit bureaus, e.g., Eqifax, Expedian, and TransUnion, and sends an alert to the user's mobile device 156 if there is a negative reporting to any of the credit bureaus.

The embodiments illustrated and discussed in this specification are intended only to teach those skilled in the art the best way known to the inventors to make and use the invention. The above-described embodiments of the invention may be modified or varied, and elements added or omitted, without departing from the invention, as appreciated by those skilled in the art in light of the above teachings. For example, the order in which the steps are performed may be varied as long as the above-described dependencies are maintained. It is therefore to be understood that, within the scope of the claims and their equivalents, the invention may be practiced otherwise than as specifically described.

What is claimed is:

1. A secure information storage and delivery method comprising:
   creating a secure vault associated with a user in a vault repository, the secure vault being adapted to securely store data;
   receiving a service level associated with the secure vault, the service level comprising at least one of a data type or a data size limit associated with the secure vault;
   receiving at least one data entry;
   storing the at least one data entry in the secure vault if the at least one of a size or a type of the at least one data entry is consistent with the service level;
   creating a mobile vault on a mobile device based on the secure vault;
   receiving user authentication information from the mobile device for authentication;
   synchronizing the mobile vault with the secure vault, comprising, for each of the at least one data entry:
      determining whether the at least one data entry on the secure vault is transferable to or storable on the mobile vault based on at least one of the size or the type of the at least one data entry; and
      transferring the at least one data entry from the secure vault to a corresponding data entry on the mobile vault if the at least one data entry on the secure vault is determined to be transferable to or storable on the mobile vault;
   uploading a soft token on the mobile device, the soft token being adapted to generate, a first one-time password;
   receiving the first one-time password generated by the soft token from the mobile device;
   generating a second one-time password; and
   authenticating the mobile device to access the secure vault based on the first and the second one-time passwords.

2. The secure information storage and delivery method of claim 1, further comprising:
   receiving an access ID and a password associated with the user from the mobile device; and
   authenticating the user based on the access ID and password.

3. The secure information storage and delivery method of claim 1, further comprising determining a direction of synchronization based on the time of last update to the mobile vault and the secure vault.

4. The secure information storage and delivery method of claim 1, wherein the at least one data entry on the secure vault is not transferable to the mobile vault or is not storable on the mobile vault, further comprising:
   preventing the at least one data entry from being transferred to the mobile vault.

5. The secure information storage and delivery method of claim 4, further comprising:
   creating a snapshot corresponding to the at least one data entry, the snapshot comprising at least one of a portion, a compression, or a truncated version of the at least one data entry; and
   transferring the snapshot to the mobile device.

6. The secure information storage and delivery method of claim 1, wherein the at least one data entry on the secure vault is too large for at least one of transmission to or storage on the mobile vault, further comprising:
   receiving a destination address for the at least one data entry to be sent from the user; and
   transferring the at least one data entry to the destination address.

7. The secure information storage and delivery method of claim 1, further comprising:
   creating a web vault on a user computing device, the web vault being capable of synchronization with the secure vault;
   uploading a soft token on the user computing device, the soft token being adapted to generate a first one-time password for access to the secure vault; and
   receiving the first one-time password generated by the soft token from the user computing device;
   generating a second one-time password; and
   authenticating the user computing device to access the secure vault based on the first and the second one-time passwords.

8. The secure information storage and delivery method of claim 1, further comprising:
   receiving a request for data, a delivery method, and a destination address from the mobile device;
   identifying data corresponding to the request in the secure vault;
   formatting the data according to the delivery method; and
   forwarding the data to the destination address.

9. The secure information storage and delivery method of claim 8, wherein the delivery method comprises at least one fax, email, or SMS text.

10. The secure information storage and delivery method of claim 1, wherein the soft token is configured to generate the first one-time password upon user request and the mobile device is configured to display the generated first one-time password, further comprising:

receiving the first one-time password generated by the soft token of the mobile device from a computing device, wherein the computing device does not include a web vault;

generating a second one-time password; and authenticating the user on the computing device based on the first and the second one-time passwords.

11. The secure information storage and delivery method of claim 1, wherein the soft token is configured to generate the first one-time password using at least one of a mathematical algorithm based on a previous one-time password, a time-synchronization between with a one-time password server and the soft token, or a mathematical algorithm based on a challenge and a counter.

12. A secure information storage and delivery system comprising:

a vault repository including a storage in which a database is stored, the database having stored therein a secure vault associated with a user, wherein the secure vault is associated with a service level comprising at least one of a data type or a data size limit associated with the secure vault, the secure vault being adapted to receive and at least one data entry and securely store the at least one data entry if the at least one of a size or a type of the at least one data entry is consistent with the service level; and a mobile vault server including an internal memory storing application code that, when executed, manages and processes requests, the mobile vault server configured to be coupled to the vault repository, the mobile vault server configured to create a mobile vault on a mobile device based on the secure vault and configured to authenticate the mobile device based on user authentication information, the mobile vault server comprising:

a mobile device handler configured to communicate with the mobile device; and a synchronization utility that determines whether the at least one data entry on the secure vault is transferable to or storable on the mobile vault based on at least one of the size or the type of the at least one data entry and transfers the at least one data entry from the secure vault to a corresponding data entry on the mobile vault if the at least one data entry on the secure vault is determined to be transferable to or storable on the mobile vault, wherein the mobile vault server is configured to upload a soft token on the mobile device, the soft token being adapted to generate a first one-time password, wherein the soft token generates a first one-time password, the vault repository generates a second one-time password, and the vault repository authenticates the user mobile device to access the secure vault based on the first and the second one-time passwords.

13. The secure information storage and delivery system of claim 12, wherein the mobile vault server is configured to create a web vault on a user computing device, the web vault being capable of synchronization with the secure vault, wherein the mobile vault server uploads the soft token on the user computing device, the soft token being adapted to generate the first one-time password for access to the secure vault, wherein the soft token generates the first one-time password, and the vault repository authenticates the user computing device to access the secure vault based on the first and the second one-time passwords.

14. The secure information storage and delivery system of claim 13, wherein the soft token is configured to generate the first one-time password for display on the mobile device upon a user request for the third one-time password, wherein the mobile vault server is configured to receive the first one-time password from the user on a computing device not including a web vault and authenticate and the vault repository is configured to generate a second one-time password and authenticate the user using the first and the second one-time passwords.

15. The secure information storage and delivery system of claim 12, wherein the mobile vault server is configured to:

receive a request for data, a delivery method, and a destination address from the mobile device;

identify data corresponding to the request in the secure vault;

format the data according to the delivery method; and forward the data to the destination address.

16. The secure information storage and delivery system of claim 12, further comprising a service management server coupled to the vault server, the service management server being adapted to provide a service to the mobile device.

17. The secure information storage and delivery system of claim 16, wherein the service management server is coupled to at least one of a banking services provider, a legal advice provider, a financial advice provider, a traveling advisory provider, an identity theft solutions provider, or a credit monitoring provider.

18. The secure information storage and delivery system of claim 12, further comprising a virtual private network adapted to connect the mobile vault server to the vault repository via a private application programming interface.

19. The secure information storage and delivery system of claim 12, wherein said at least one data entry comprises at least one of a password, access point, card, loyalty, text file, photograph, or large document.

* * * * *